(12) United States Patent
Honda

(10) Patent No.: US 8,572,307 B2
(45) Date of Patent: Oct. 29, 2013

(54) MEMORY CONTROLLER, MEMORY CARD, AND NONVOLATILE MEMORY SYSTEM

(75) Inventor: Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 890 days.

(21) Appl. No.: 12/373,839

(22) PCT Filed: Jul. 15, 2008

(86) PCT No.: PCT/JP2008/001898
§ 371 (c)(1),
(2), (4) Date: Jan. 14, 2009

(87) PCT Pub. No.: WO2009/013877
PCT Pub. Date: Jan. 29, 2009

(65) Prior Publication Data
US 2010/0228905 A1    Sep. 9, 2010

(30) Foreign Application Priority Data

Jul. 20, 2007  (JP) ................................ 2007-189345

(51) Int. Cl.
*G06F 13/00* (2006.01)
(52) U.S. Cl.
USPC .................... 711/103; 711/202; 711/E12.008
(58) Field of Classification Search
USPC ................................. 711/103, 202, E12.008
See application file for complete search history.

(56) References Cited

U.S. PATENT DOCUMENTS

| | | | |
|---|---|---|---|
| 2003/0189860 A1* | 10/2003 | Takeuchi et al. ............. | 365/200 |
| 2005/0144361 A1 | 6/2005 | Gonzalez et al. | |
| 2007/0214310 A1 | 9/2007 | Ishimoto et al. | |
| 2008/0086614 A1* | 4/2008 | Canis et al. .................. | 711/163 |
| 2008/0140919 A1* | 6/2008 | Torabi et al. ................. | 711/103 |
| 2010/0228885 A1* | 9/2010 | McDaniel ....................... | 710/5 |

FOREIGN PATENT DOCUMENTS

| | | |
|---|---|---|
| JP | 09-128155 | 5/1997 |
| JP | 2001-325128 | 11/2001 |
| JP | 2002-366423 | 12/2002 |
| JP | 2006-065505 | 3/2006 |
| JP | 2006-127234 | 5/2006 |
| JP | 2006-155129 | 6/2006 |
| JP | 2007-517320 | 6/2007 |
| JP | 2007-241896 | 9/2007 |
| WO | WO 2005/106673 A1 | 11/2005 |

* cited by examiner

*Primary Examiner* — Edward Dudek, Jr.

(74) *Attorney, Agent, or Firm* — McDermott Will & Emery LLP

(57) ABSTRACT

A nonvolatile memory system includes a memory card (102) and host equipment (101). The memory card (102) includes a nonvolatile memory (106) including a plurality of physical blocks, and a memory controller (105) for writing data into the nonvolatile memory (106). The host equipment (101) provides to the memory card (102) an access instruction that designates a logical address and a channel number. The memory controller (105) has an address conversion function for converting the logical address into a physical address in the nonvolatile memory (106), a write destination determination function for determining in relation to the channel number a physical address in the nonvolatile memory (106) to which the data is to be written, and a channel management function for individually managing for each channel number a write state in which data of a smaller size than each physical block is written.

15 Claims, 8 Drawing Sheets

| Channel number | Logical block address | Physical block address | Top logical page | Next written page |
|---|---|---|---|---|
| Ch. 0 | 0x0030 | 0x0030 | 0x0030 | 0x0040 |
| Ch. 1 | 0x0010 | 0x0010 | 0x0010 | 0x0080 |
| Ch. 2 | 0x0040 | 0x0040 | 0x0040 | 0x0060 |
| Ch. 3 | 0x0020 | 0x0020 | 0x0020 | 0x00A0 |

FIG.6

| Logical channel number (601) | Logical channel usage (602) | Channel number for memory card (603) |
|---|---|---|
| Ch. 0 | Available | − |
| Ch. 1 | In use | Ch. 0 (No designation) |
| Ch. 2 | In use | Ch. 1 |
| Ch. 3 | In use | Ch. 3 |
| Ch. 4 | Available | − |
| ⋮ | ⋮ | ⋮ |
| Ch. 31 | In use | Ch. 0 (No designation) |

MEMORY CONTROLLER, MEMORY CARD, AND NONVOLATILE MEMORY SYSTEM

TECHNICAL FIELD

The present invention relates to a technique for writing data into a nonvolatile memory without degrading the performance thereof.

BACKGROUND ART

In recent years, the market for memory cards incorporating nonvolatile memories, as storage media in digital cameras and cell phones, has been expanding. And the capacity of NAND flash memories, which are nonvolatile memories used in memory cards, has been increasing as miniaturization of semiconductor fabrication processes has been advanced.

Along with this capacity increase, the amount of files recordable into a memory card has been increasing. Therefore, memory cards are being used for digital movies as well, for which memory cards have not been used before, and large files, such as moving image files, are recorded in memory cards. When a moving image file of a movie is being recorded, it is necessary to take moving images while recording the images in the memory card. Thus, although the moving image file is a single file, writing is performed multiple times at fixed time intervals to write the file of large size.

Also, as the capacity of nonvolatile memories has been increased, the capacity of physical blocks, which are erase units, in NAND flash memories has been increased.

However, the increase in the size of written files and the increase in block capacity in NAND flash memories are events independent of each other, and thus cause degradation in performance in writing to memory cards. Patent Document 1 discloses factors of such performance degradation and a method for avoiding such performance degradation.

Furthermore, as the capacity of cards increases, it will become possible to store various kinds of information in a single memory card, consequently enabling the use of the memory card in a system in which different types of files are written in parallel. For example, a system is possible in which while a moving image file is recorded and audio in a different file is also recorded, still images can be recorded at any timing desired by the user. In another possible system, moving image files from multiple surveillance cameras can be written into multiple files in parallel. In these systems, the host equipment, which is equipment for writing data into the memory card, just writes data having logical meanings (i.e., types) in parallel, but, in the memory card, multiple files are randomly written in a mixed manner. With the solution disclosed in Patent Document 1, the performance of these systems cannot be maintained.

Patent Document 1: Japanese Laid-Open Publication No. 2002-366423
Patent Document 2: Japanese Laid-Open Publication No. 9-128155
Patent Document 3: Japanese Laid-Open Publication No. 2001-325128
Patent Document 4: Japanese Laid-Open Publication No. 2006-65505
Patent Document 5: International Publication WO 2005/106673

DISCLOSURE OF THE INVENTION

Problem that the Invention Intends to Solve

As described above, the write operation of recording multiple files in parallel, which has not been performed very much between conventional hosts and memory cards, extremely degrades the write performance of the memory cards.

To be specific, if multiple files are written in parallel, fragmentation will occur, leading to performance degradation at the time of reading. In order to deal with this file fragmentation, if the host writes files in such a manner as to make the write addresses of these files be consecutive, the addresses at which the memory card is to be written will not be consecutive, again leading to performance degradation. Also, in Patent Document 1, "block merge processing" is needed in a mechanism for enhancing the speed of writing, resulting in a temporary increase in processing time. This processing occurs in the memory card regardless of the type of data to be written, thus leading to a new problem in which the write performance thereof is degraded at the timing that the host cannot predict.

It is therefore an object of the present invention to provide a nonvolatile memory system, a nonvolatile memory, and a memory controller in which the write performance thereof is not degraded even when multiple files are written in parallel.

Means for Solving the Problem

An inventive memory controller, which writes data into a nonvolatile memory in accordance with an externally provided access instruction that designates a logical address and a channel number, includes: an address conversion function for converting the logical address into a physical address in the nonvolatile memory; and a write destination determination function for determining in relation to the channel number a physical address in the nonvolatile memory to which the data is to be written.

The nonvolatile memory includes a plurality of physical blocks which are erase units; and the address conversion function converts the logical address into the physical address in units of the physical blocks.

The memory controller further includes a channel management function for individually managing for each channel number a write state in which data of a smaller size than each physical block is written.

An inventive memory card includes: a nonvolatile memory including a plurality of physical blocks; and the memory controller described above.

An inventive nonvolatile memory system includes: a memory card including a nonvolatile memory and a memory controller for writing data into the nonvolatile memory, the nonvolatile memory including a plurality of physical blocks; and host equipment for providing to the memory card an access instruction that designates a logical address and a channel number.

The memory controller includes: an address conversion function for converting the logical address into a physical address in the nonvolatile memory; and a write destination determination function for determining in relation to the channel number a physical address in the nonvolatile memory to which the data is to be written.

The memory controller further includes a channel management function for individually managing for each channel number a write state in which data of a smaller size than each physical block is written.

The host equipment designates the same channel number for writing of data belonging to the same file.

The host equipment designates a specific channel number for writing of file system information which is file management information.

Effects of the Invention

According to the invention, the host designates a channel number in addition to a logical address, and writes data into the memory card. For such writing in which a channel number is designated, the memory controller manages for each channel number a write state in which data of a smaller size than each physical block of the nonvolatile memory is written. And for the writing from the host, the memory controller determines, in accordance with the write state of the corresponding channel number, a physical block to which the data is to be written, and writes the data into that physical block.

Therefore, even if, for a channel number, data writing is divided and performed multiple times, aggregation processing that will cause performance degradation will not occur so long as the series of writing is performed in the order of logical addresses regardless of how writing is performed for the other channel numbers during the series of writing. Suppose a situation in which, for a channel number, writing to a physical block has been performed halfway. In this situation, no aggregation processing is performed, and the halfway state in that physical block is maintained regardless of what writing is performed to what degree for the other channel numbers.

As described above, according to the invention, since unnecessary aggregation processing, such as aggregation processing for different channels, is not performed, performance is not degraded even when multiple files are written in parallel.

BRIEF DESCRIPTION OF DRAWINGS

FIG. 6 is a channel conversion table for a driver.

EXPLANATION OF THE REFERENCE CHARACTERS

Figure 1:
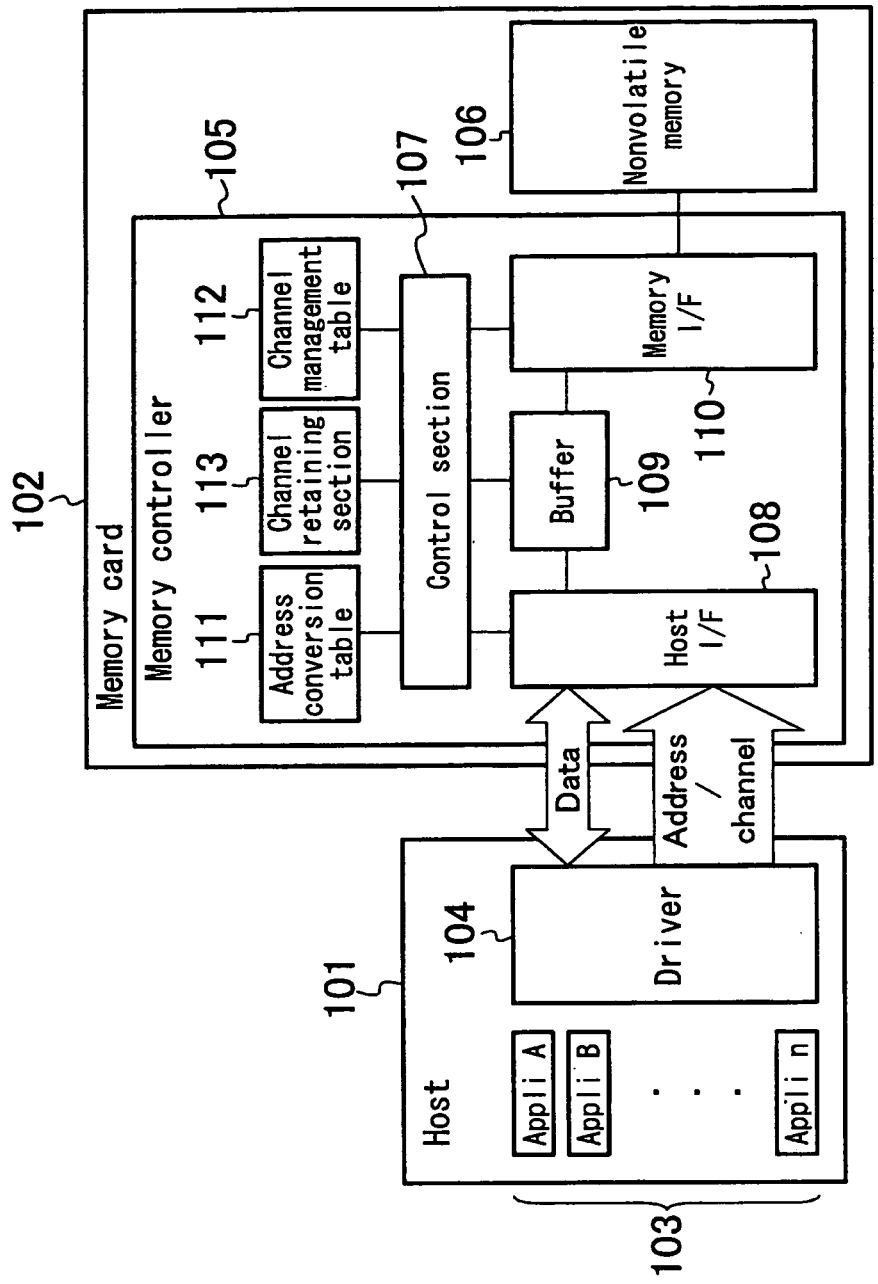
FIG. 1 is a block diagram illustrating the configuration of a nonvolatile memory system according to an embodiment of the invention.

101 Host
102 Memory card
103 Set of application software programs
104 Driver
105 Memory controller
106 Nonvolatile memory
107 Control section
108 Host I/F
109 Buffer
110 Memory I/F
111 Address conversion table
112 Channel management table
113 Channel retaining section

BEST MODE FOR CARRYING OUT THE INVENTION

A nonvolatile memory system and a nonvolatile memory device according to embodiments of the present invention will be described.

FIG. 1 is a block diagram illustrating the configuration of a nonvolatile memory system according to an embodiment of the present invention. This nonvolatile memory system includes a host 101 and a memory card 102. The host 101 reads data from or writes data into the memory card 102 after specifying an address for the data. The memory card 102 stores the data written from the host 101 in a nonvolatile manner, and thus retains the written data even in the absence of application of power and allows the data to be read therefrom after power is applied again. The memory card 102 is configured so as to be attachable to and removable from the host 101, and the host 101 applies power to the memory card 102.

In FIG. 1, the configuration of software in the host 101 is illustrated. The reference numeral 103 refers to a set of application software programs, and the multiple application software programs Appli A to n operate in the host 101. The reference numeral 104 denotes a driver for controlling interfacing with the memory card 102, and the set of application software programs 103 can read data from and write data into the memory card 102 through the driver 104.

The memory card 102 includes a memory controller 105 and a nonvolatile memory 106. A memory cell array in the nonvolatile memory 106 is composed of a plurality of physical blocks (not shown). The physical blocks are data erase units and composed of a plurality of physical pages (not shown). The physical pages are write units in which data can be simultaneously written. In the memory card 102, the memory controller 105 writes data written from the host 101 into the nonvolatile memory 106, and reads data that is to be read into the host 101 from the nonvolatile memory 106.

In the memory controller 105, a control section 107 controls the operation of the entire memory controller 105. Data transmitted between the host 101 and the nonvolatile memory 106 for reading and writing go through a host I/F 108, a buffer 109, and a memory I/F 110. The host I/F 108 controls interfacing with the host 101, and when the host 101 reads data, the host I/F 108 transmits the data in the buffer 109 to the host 101, and transmits data written from the host 101 to the buffer 109. The buffer 109 is disposed between the host I/F 108 and the memory I/F 110, and is composed of a volatile memory in which data read and written by the host 101 is held temporarily. The memory I/F 110 controls interfacing with the nonvolatile memory 106, and transmits data to be written into the nonvolatile memory 106 from the buffer 109 to the nonvolatile memory 106 and transmits data read from the nonvolatile memory 106 to the buffer 109. The host I/F 108, the buffer 109, and the memory I/F 110 are all controlled by the control section 107.

The control section 107 uses an address conversion table 111, a channel management table 112, and a channel retaining section 113 to determine an address in the nonvolatile memory 106 to which data written from the host 101 is written. The address conversion table 111 indicates the correlations between the addresses of logical blocks designated by the host 101 and the addresses of physical blocks in the nonvolatile memory 106. In this embodiment, data written over the same logical block address as that of data already written into a physical block registered in the address conversion table 111 is allowed to be written into a physical block that is different from that physical block registered in the address conversion table 111. The physical block into which this overwriting data is written is managed by the channel management table 112. The configuration of the channel management table 112 will be discussed later. The channel retaining section 113 retains a channel number designated in a channel designation command issued from the host 101.

Figure 2:
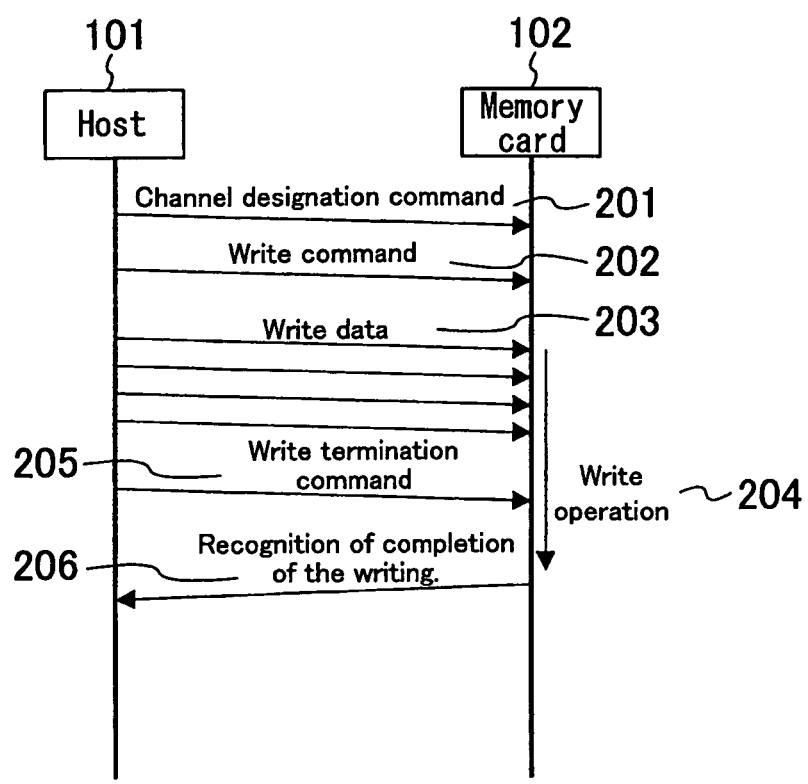
FIG. 2 is a sequence diagram between a write host and a memory card.

FIG. 2 is a sequence diagram between the host 101 and the memory card 102 when a file of large size (for example, a moving image file, etc.) that requires continuous writing is written from the host 101 into the memory card 102 with a channel therefor designated. This will be discussed below with reference to FIG. 2.

First, in Step 201, the host 101 issues a channel designation command to the memory card 102. The issuance of this channel designation command was not performed in the conventional examples. In this step, notification of information on the type of data (associated with the type of the set of application software programs 103 in the host 101, which will be described later) that is to be written into the memory card 102 by the host 101 is provided in the form of a channel. This step is indispensable to achieve effects of this embodiment.

Next, in Step 202, the host 101 issues a write command to the memory card 102.

Then, in Step 203, the host 101 commences transmission of the write data to the memory card 102. From that time forward, the host 101 transmits a necessary amount of data to the memory card 102. In response to this commencement of the data transmission, the memory card 102 starts a write operation 204.

Upon completion of the transmission of the write data to the memory card 102, the host 101 issues a write termination command to the memory card 102 in Step 205.

The memory card 102, which is performing the operation of writing the write data from the host 101 into the nonvolatile memory 106 in the memory card 102, recognizes, upon receipt of the write termination command issued in Step 205, that the transmission of the write data is completed, and performs the write operation 204 until writing of the data already transmitted is completed. During this write operation 204, the memory card 102 outputs a busy signal to the host 101, thereby notifying the host 101 that the write operation 204 is being performed.

When the write operation 204 is completed, the memory card 102 stops the output of the busy signal to the host 101, whereby, in Step 206, the host 101 recognizes the completion of the writing into the memory card 102.

Next, processing performed by the memory card 102 will be described with reference to FIGS. 3 to 5, and processing performed by the host 101 will be described with reference to FIGS. 6 to 9.

Figures 3, 4:
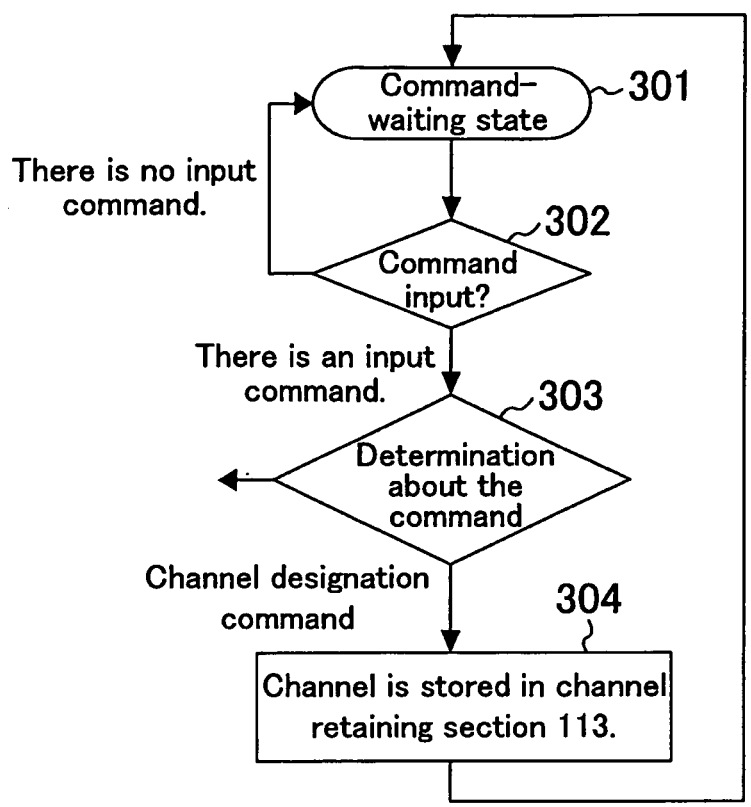
FIG. 3 is a flowchart indicative of channel identification in the memory card.
FIG. 4 illustrates an example of the configuration of a channel management table.

FIG. 3 is a flowchart indicative of processing performed by the control section 107 in the memory controller 105 when the channel designation command is issued in Step 201 in FIG. 2.

In State 301, the control section 107 is in a command-waiting state in which the control section 107 is waiting for the issuance of a command from the host 101.

In Determination 302, it is determined whether or not a command has been input from the host 101. During the period of time in which no command is input from the host 101, the control section 107 maintains the command-waiting state 301.

When a command is issued from the host 101 to the memory card 102, it is determined in Determination 302 that the command has been input, and a transition is made to Determination 303. In Determination 303, the content of the command is determined. Since this is the processing performed when the channel designation command is issued in Step 201 in FIG. 2, a transition is made to State 304. In FIG. 3, cases in which commands other than the channel designation command are issued are omitted.

In State 304, the control section 107 stores a channel number designated in the channel designation command in the channel retaining section 113.

Thereafter, a transition is made to State 301, and the control section 107 again goes into the command-waiting state. That is, the memory controller 105 has the function of retaining the channel number designated in the channel designation command from the host 101.

FIG. 4 illustrates an example of the configuration of the channel management table 112.

The channel management table 112 contains a plurality of records. Each row in the table in FIG. 4 corresponds to one record. Each channel has one record, and each record has a field for a channel number without exception. In other words, when a channel number is determined, one record in the channel management table 112 is determined. Each record includes: a logical block address (which is part of a logical address managed by the address conversion table 111); a physical block address (which is part of a physical address managed by the address conversion table 111); a top logical page (which is the logical page address of data written into the top page in the physical block indicated by the physical block address); and a next written page (which is a physical page in the physical block indicated by the physical block address and to which next writing is performed). In the channel management table 112, unlike in the address conversion table 111, the physical blocks indicated by the physical block addresses in the channel management table 112 contain unwritten physical pages. According to the next written page, the channel management table 112 keeps track of which physical page is the last written physical page. In terms of management of the physical blocks containing unwritten physical pages, the channel management table 112 takes a similar role to a log pointer table described in Patent Document 1. However, the channel management table 112 is characterized by having one record for each channel number indicated from outside the memory card 102. The general concepts of the top logical page and of the next written page are described in Patent Document 5.

Figure 5:
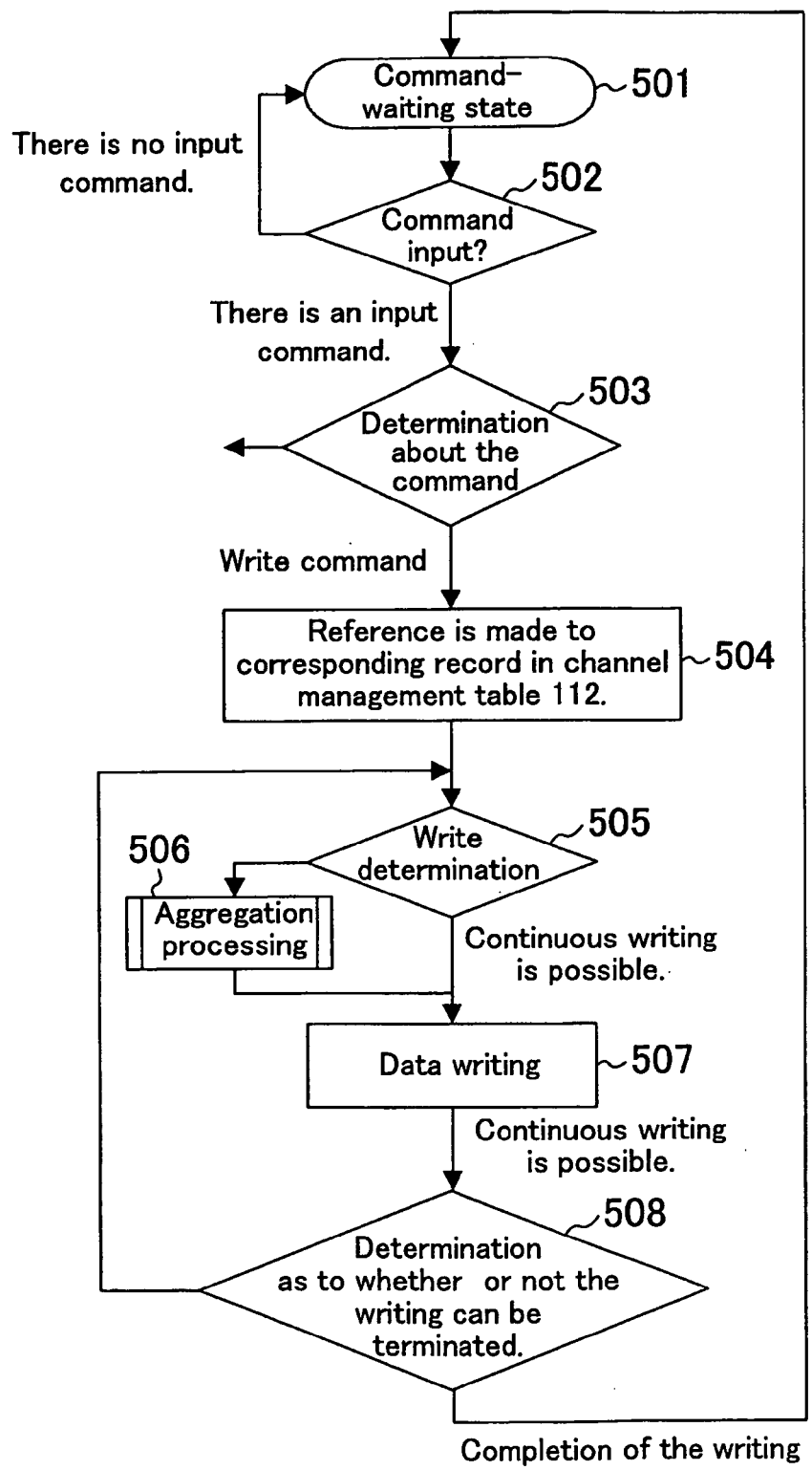
FIG. 5 is a flowchart indicative of a write operation in the memory card.

FIG. 5 is a flowchart indicating the details of the write operation 204 in FIG. 2.

State 501 and Determination 502 are the same as State 301 and Determination 302 shown in FIG. 3, respectively.

In Determination 503, the content of the command is determined as in Determination 303 in FIG. 3, but in FIG. 5, if the command is a write command, a transition is made to State 504. In FIG. 5, cases in which commands other than the write command are issued are omitted.

In State 504, in accordance with the channel number retained in the channel retaining section 113, the control section 107 retrieves a corresponding record in the channel management table 112, and a transition is made to Determination 505.

In Determination 505, a write determination is made. This processing is the same as the determination described in Patent Document 1 as to whether or not to perform "block merge processing". In this embodiment, this processing is described as "aggregation". When aggregation is needed, a transition is made to State 506 to perform aggregation processing, and thereafter, a transition is made to State 507 to perform the data write operation. If it is determined in Determination 505 that aggregation is not necessary, and thus the data writing is possible, a transition is made directly to State 507 to perform the data write operation.

After the data writing is performed in State 507, it is determined in Determination 508 whether or not the writing can be terminated, that is, whether or not all of the write data from the host 101 has been written. If there is data that has not yet been written, a transition is made to Determination 505 to continue the write operation.

After the issuance of the write termination command 205, when all of the write data from the host 101 has been written into the nonvolatile memory 106, it is determined in Determination 508 that the writing is completed, and the process returns to State 501.

In this embodiment, data from the host 101 is written in the above-described manner. In the memory card 102, by the write operation shown in FIG. 5, that is, by the rule that data is written in accordance with the record in the channel management table 112 corresponding to the channel designated by the host 101, it is possible to retain write states corresponding to the channels that are not designated by the host 101. Specifically, in the conventional examples, since a concept equivalent to the channels in this embodiment is not employed, unnecessary aggregation processing, such as aggregation processing for different channels, may be performed. In contrast, in this embodiment, aggregation processing corresponding to each channel is performed, so that unnecessary aggregation does not occur, thereby ensuring a certain level of performance.

Next, processing performed by the host 101 will be discussed.

FIG. 6 is a channel conversion table which is used by the driver 104 when the driver 104 performs processing in response to issuance of a read or write task from the set of application software programs 103. The driver 104 prepares logical channel numbers from 0 to 31 (which are different from the channels used between the host 101 and the memory card 102) for the set of application software programs 103. The driver 104 reads or writes data in accordance with a logical channel number designated from the set of application software programs 103, so that eve if read or write tasks from the multiple application software programs Appli A to Appli n in the set of application software programs 103 are issued, the driver 104 can read or write data of the appropriately corresponding application software programs.

The table in FIG. 6 contains a plurality of records, with one record for each logical channel. Each record has a field 601 indicating a logical channel number, a field 602 indicating logical channel usage, and a field 603 indicating a channel number for designating a channel for the memory card 102. In each field 601, a logical channel number designated from the set of application software programs 103 is retained. In each field 602, information is retained which indicates whether the corresponding logical channel number is open and thus "in use" or the corresponding logical channel number is unused or closed and thus "available". In each field 603, a channel number for the memory card 102 is retained. This channel number for the memory card 102 is designated when a write operation in which the corresponding logical channel number is designated is performed to write data into the memory card 102. In the fields 603, the same channel numbers, except for channel 0, are not present in multiple places. Only channel 0 is a special channel number that can be set in multiple places.

Figure 7:
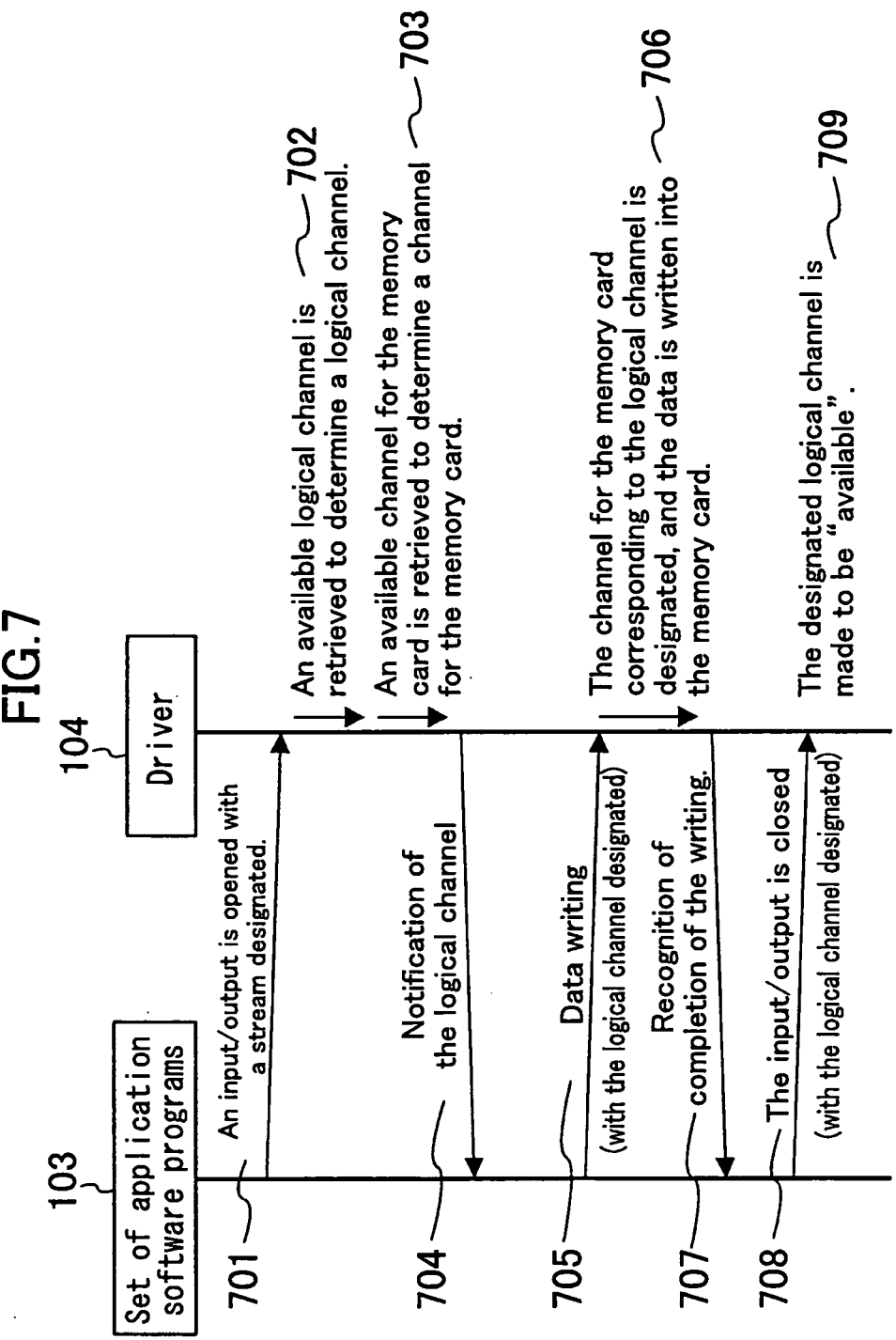
FIG. 7 is a sequence diagram indicative of logical channel assignment by the host in a case in which a stream is designated.

FIG. 7 is a sequence diagram indicating logical channel assignment between the set of application software programs 103 and the driver 104 when a file of large size (for example, a moving image file, etc.) that needs continuous writing is written.

First, in Step 701, one of the set of application software programs 103 opens an input/output for the driver 104 with a stream designated.

In response to this, in Processing 702, the driver 104 retrieves a record whose logical channel usage in the field 602 in the channel conversion table in FIG. 6 is "available".

Next, in Processing 703, the driver 104 retrieves an unused channel number from the channel numbers indicated in the channel numbers for the memory card 102 in the fields 603 in the channel conversion table.

In Step 704, the driver 104 notifies the application software program of the logical channel number corresponding to that record retrieved in Processing 702 and having the field 602 indicating "available", and the driver 104 records in the field 603 of that record the unused channel number for the memory card 102 that was retrieved in Processing 703.

In Step 705, the application software program designates the logical channel number of which the application software program was notified in Step 704 and writes the data.

In Processing 706, the driver 104 writes the data into the memory card 102 by using the channel number for the memory card 102 that is indicated in the field 603 of the record in the channel conversion table that corresponds to the logical channel designated by the application software program in Step 705. This write operation in which the channel number is designated corresponds to that described with reference to the sequence diagram in FIG. 2.

In Step 707, the application software program recognizes that the driver 104 has completed the writing. When necessary, the application software program performs writing multiple times (in Step 705, in Processing 706, and in Step 707) by using the same logical channel, thereby writing the moving image file or the like.

After the completion of the writing of the file, the application software program designates the logical channel and closes the input/output in Step 708.

In response the close of the input/output, the driver 104 performs Processing 709 in which the field 602 of the record in the channel conversion table corresponding to the logical channel designated in Step 708 is made to indicate "available", and the field 603 thereof is made to indicate "no channel designation".

Figure 8:
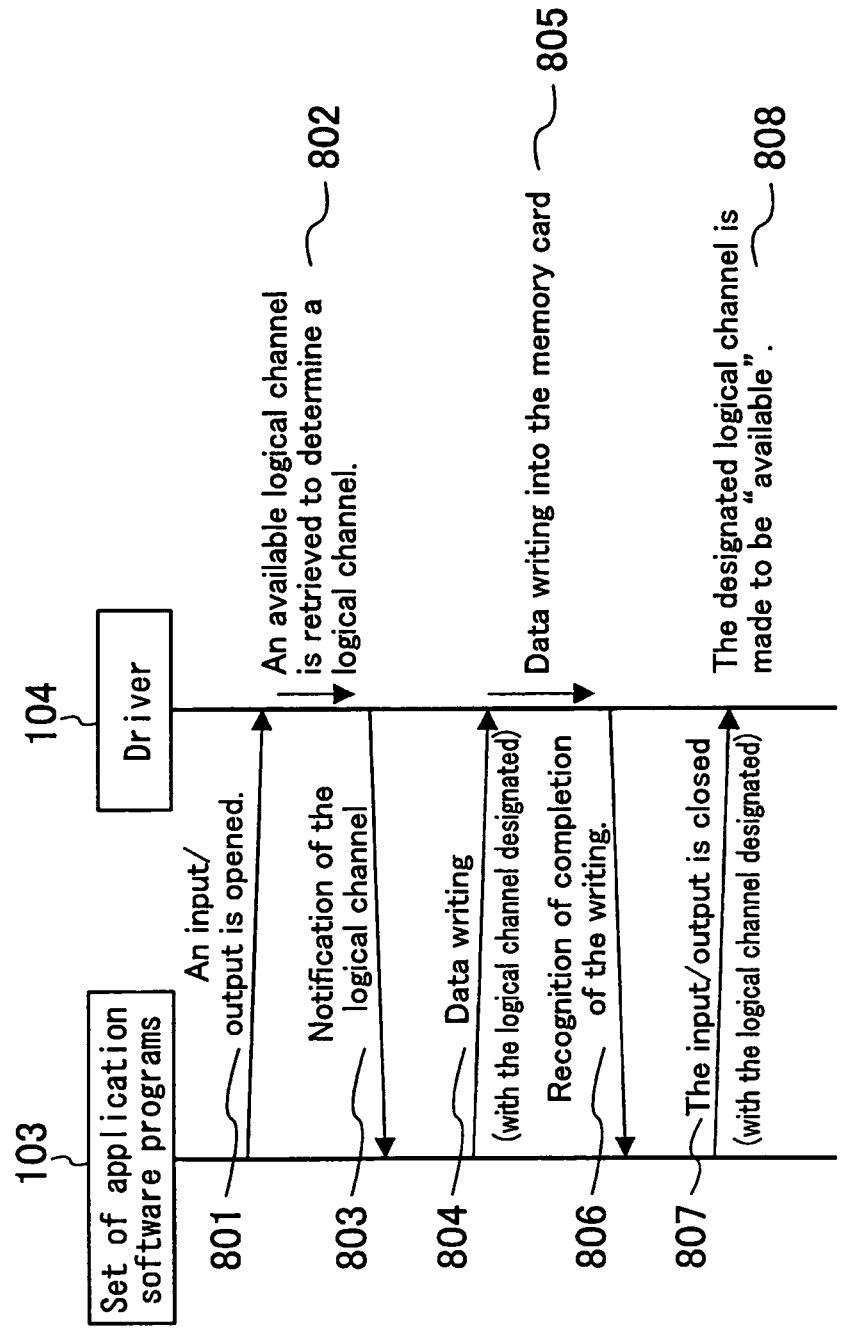
FIG. 8 is a sequence diagram indicative of logical channel assignment by the host in a case in which no stream is designated.

FIG. 8 is a sequence diagram indicating logical channel assignment between the set of application software programs 103 and the driver 104 when a file of a relatively smaller size as compared to that in FIG. 7 is written.

First, in Step 801, one of the set of application software programs 103 opens an input/output for the driver 104 with no stream specified.

In response to this, in Processing 802, the driver 104 retrieves a record whose logical channel usage in the field 602 in the channel conversion table in FIG. 6 is "available".

In Processing 803, the driver 104 notifies the application software program of the logical channel number corresponding to that record retrieved in Processing 802 and having the field 602 indicating "available", and the driver 104 records the special channel number "channel 0 (no designation)" in the field 603 of that record.

In Step 804, the application software program designates the logical channel number of which the application software program was notified in Step 803 and writes the data.

In Processing 805, the driver 104 writes the data into the memory card 102 without designating a channel.

In Step 806, the application software program recognizes that the driver 104 has completed the writing. When necessary, the application software program performs writing multiple times (in Step 804, in Processing 805, and in Step 806) by using the same logical channel.

After the completion of the writing of the file, the application software program designates the logical channel and closes the input/output in Step 807.

In response the close of the input/output, the driver 104 performs Processing 808 in which the field 602 of the record in the channel conversion table corresponding to the logical channel designated in Step 807 is made to indicate "available", and the field 603 thereof is made to indicate "no channel designation".

Figure 9:
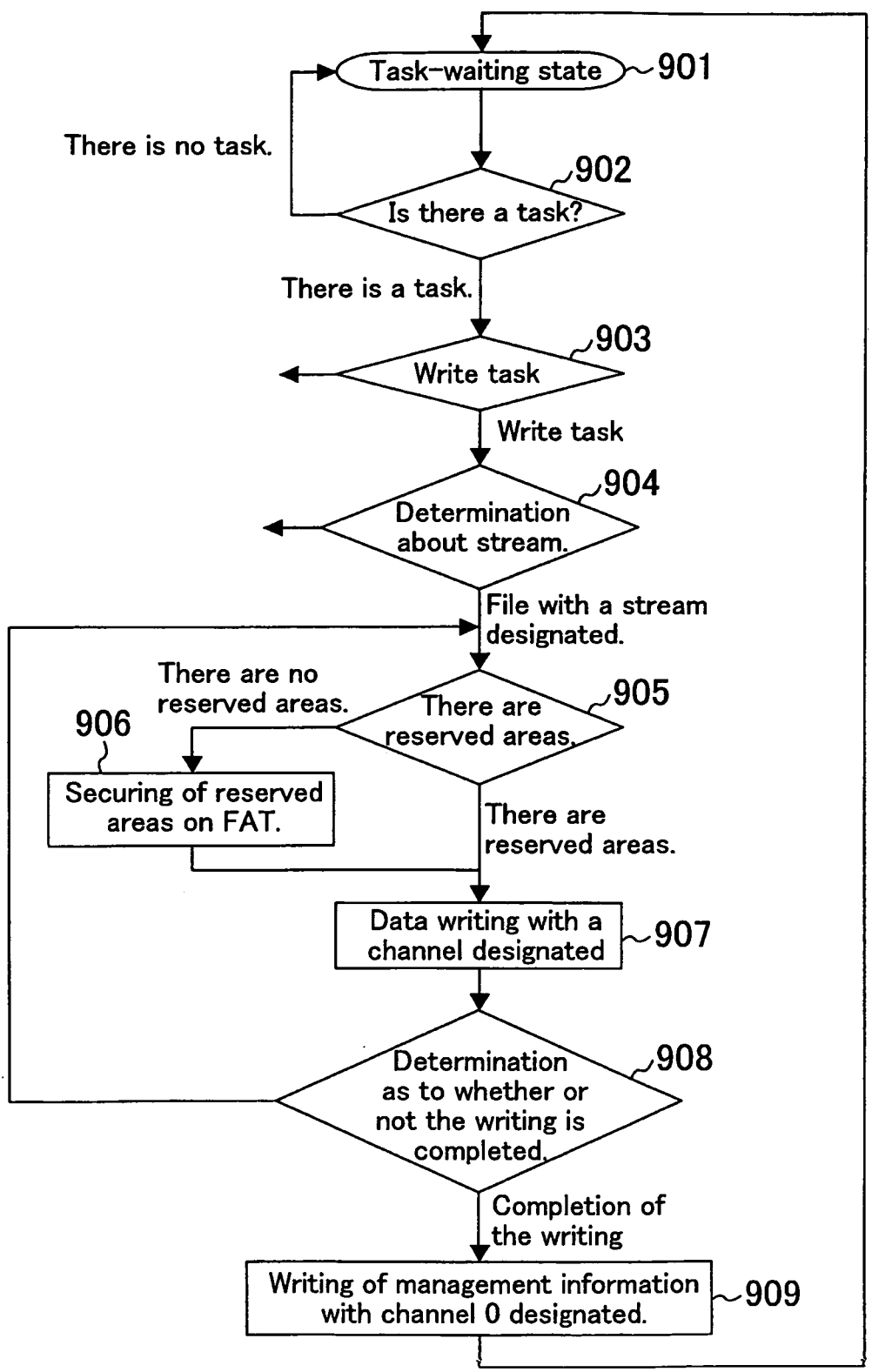
FIG. 9 is a flowchart indicative of a write operation by the driver.

FIG. 9 is a flowchart of processing of the driver 104 that corresponds to the writing (in Step 705, in Processing 706, and in Step 707) in the sequence diagram in FIG. 7 performed with a logical channel designated.

In State 901, the driver 104 is in a task-waiting state in which the driver 104 is waiting for issuance of a task from the set of application software programs 103.

In Determination 902, it is determined whether or not there is a task from the set of application software programs 103. During the period of time in which no task is input from the set of application software programs 103, the driver 104 maintains the task-waiting state 901.

After a task is issued from the set of application software programs 103 to the driver 104, it is determined in Determination 902 that there is the task, and a transition is made to Determination 903. In Determination 903, if it is determined that the task is a write task, a transition is made to Determination 904. In Determination 904, it is determined whether the write task is to write into a logical channel with a stream designated or to write into a logical channel with no stream designated. If it is determined that the write task is stream-designated writing, a transition is made to Determination 905.

In Determination 905, it is determined whether or not there are already reserved areas on FAT and thus writing is possible. In the case of stream-designated writing, there are no reserved areas at the time of the first writing. Hence, in this case, it is determined that there are no reserved areas, and a transition is made to State 906.

In State 906, since it is expected that, from this time forward, write tasks will be continuously issued from the set of application software programs 103, reserved areas for writing are secured beforehand on the FAT. The securing of reserved areas is processing in which instead of performing ordinary processing (i.e., after data is written into an area on the FAT in which no information is written, information on the FAT corresponding to that area into which the data has been written is considered to have been "written"), multiple areas on the FAT in which no information is written are beforehand made to be "written areas" for the purpose of "the securing of reserved areas", and thereafter, data are written into corresponding areas so as to write the data into the consecutive areas on the FTA. And a transition is made to State 907.

On the other hand, if it is determined in Determination 905 that there are reserved areas, a transition is made to State 907.

In State 907, the driver 104 writes data into the memory card 102 with a channel designated. This writing corresponds to that described in the sequence diagram in FIG. 2.

Next, in Determination 908, it is determined whether or not the writing is completed. If it is determined that the writing is not completed, a transition is made to Determination 905, and if it is determined that the writing is completed, a transition is made to State 909.

In State 909, with the special channel, i.e., channel 0, designated, the driver 104 writes management information (FAT, directory entry, etc.) corresponding to the data already written in State 907 into the memory card 102, and a transition is made to State 901.

As described above, in the nonvolatile memory system according to this embodiment, the set of application software programs 103 identifies whether a file of large size that requires continuous writing is to be written or a file of small size is to be written, and opens an input/output for the driver 104 in a selective manner (i.e., a stream is designated in the case of a large file, and no stream is designated in the case of a small file), thereby allowing the host 101 to designate a channel number in addition to a logical address, which has been designated in the conventional examples, and write the file into the memory card 102.

For such writing in which respective channel numbers are designated, the memory controller 105 manages for each channel a write state in which data of a smaller size than each physical block of the nonvolatile memory 106 is written. And, for each writing from the host 101, the memory controller 105 determines a write destination physical block, to which the data is to be written, in accordance with the write state of the channel corresponding to that writing, and then writes the data into that physical block. Although aggregation processing may occur on the data writing from the host 101 and cause degradation in the write performance, such aggregation is only due to the writing performed so far from the host 101. That is, even if, in a channel, data writing is divided and performed multiple times, aggregation processing that will cause performance degradation will not occur so long as the series of writing is performed in the order of logical addresses, regardless of how writing is performed in the other channels during the series of writing. To consider from another standpoint, suppose a situation in which, in a channel, writing to a physical block has been performed halfway. In this situation, no aggregation processing is performed, and the halfway state in the physical block is maintained regardless of what writing is performed to what degree in the other channels.

INDUSTRIAL APPLICABILITY

The present invention is applicable to a nonvolatile memory system in which multiple files are written in parallel into a nonvolatile memory device without causing degradation in performance in writing each file.

The invention claimed is:

1. A memory controller which writes data into a nonvolatile memory in accordance with an externally provided access instruction that designates a logical address and a channel number, the memory controller comprising:
   an address conversion unit for converting the logical address into a physical address in the nonvolatile memory; and
   a write destination determination unit for obtaining a physical address in the nonvolatile memory to which the data is to be written,
   wherein a physical block in which the physical address belongs is designated by the channel number, and
   data having a same channel number are written in a same physical block designated by the same channel number.

2. The memory controller of claim 1, wherein:
   the nonvolatile memory includes a plurality of physical blocks which are erase units, and
   the address conversion unit converts the logical address into the physical address in units of the physical blocks.

3. The memory controller of claim 2, further comprising a channel management unit for individually managing for each channel number a write state in which data of a smaller size than each physical block is written.

4. The memory controller of claim 2, wherein the control section is further configured to individually manage for each channel number a write state in which data of a smaller size than each physical block is written.

5. The memory controller of claim 1, wherein:
the memory controller stores a table, and
the channel number designates the physical address in the table.

6. A memory card comprising:
a nonvolatile memory including a plurality of physical blocks; and
the memory controller of claim 1.

7. A nonvolatile memory system comprising:
a memory card including a nonvolatile memory and a memory controller for writing data into the nonvolatile memory, the nonvolatile memory including a plurality of physical blocks; and
host equipment for providing to the memory card an access instruction that designates a logical address and a channel number,
wherein the memory controller includes:
an address conversion unit for converting the logical address into a physical address in the nonvolatile memory; and
a write destination determination unit for obtaining a physical address in the nonvolatile memory to which the data is to be written,
a physical block in which the physical address belongs is designated by the channel number, and
data having a same channel number are written in a same physical block designated by the same channel number.

8. The nonvolatile memory system of claim 7, wherein the memory controller further includes a channel management unit for individually managing for each channel number a write state in which data of a smaller size than each physical block is written.

9. The nonvolatile memory system of claim 7, wherein the host equipment designates the same channel number for writing of data belonging to the same file.

10. The nonvolatile memory system of claim 7, wherein the host equipment designates a specific channel number for writing of file system information which is file management information.

11. The nonvolatile memory system of claim 7, wherein:
the memory controller stores a table, and
the channel number designates the physical address in the table.

12. A memory controller which writes data into a nonvolatile memory in accordance with an externally provided access instruction that designates a logical address and a channel number, the memory controller comprising:
a control section; and
a memory interface circuit, coupled to the control section, for communicating with the nonvolatile memory, wherein:
the control section is configured to convert the logical address into a physical address in the nonvolatile memory, and obtain a physical address in the nonvolatile memory to which the data is to be written,
a physical block in which the physical address belongs is designated by the channel number, and
data having a same channel number are written in a same physical block designated by the same channel number.

13. The memory controller of claim 12, wherein:
the nonvolatile memory includes a plurality of physical blocks which are erase units, and
the control section is further configured to convert the logical address into the physical address in units of the physical blocks.

14. The memory controller of claim 12, wherein:
the memory controller stores a table, and
the channel number designates the physical address in the table.

15. A memory card comprising:
a nonvolatile memory including a plurality of physical blocks; and
the memory controller of claim 12.

* * * * *